US009363035B2

(12) United States Patent
Pauly et al.

(10) Patent No.: US 9,363,035 B2
(45) Date of Patent: Jun. 7, 2016

(54) METHOD FOR TESTING THE TRANSMISSION MODES OF A RADIO DEVICE

(75) Inventors: Andreas Pauly, Munich (DE); Martin Mueller, Rosenheim (DE); Gerald Tietscher, Freising (DE); Heino Gerlach, Munich (DE); Volker Fischer, Munich (DE); Stefan Ballmann, Aising (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 1228 days.

(21) Appl. No.: 12/934,433

(22) PCT Filed: Mar. 16, 2009

(86) PCT No.: PCT/EP2009/001891
§ 371 (c)(1),
(2), (4) Date: Sep. 24, 2010

(87) PCT Pub. No.: WO2009/127305
PCT Pub. Date: Oct. 22, 2009

(65) Prior Publication Data
US 2011/0019579 A1  Jan. 27, 2011

(30) Foreign Application Priority Data

Apr. 15, 2008 (DE) .......................... 10 2008 018 807
Dec. 18, 2008 (DE) .......................... 10 2008 063 612

(51) Int. Cl.
*H04W 4/00* (2009.01)
*H04L 1/00* (2006.01)
*H04L 1/24* (2006.01)

(52) U.S. Cl.
CPC ................ *H04L 1/0001* (2013.01); *H04L 1/24* (2013.01)

(58) Field of Classification Search
CPC ........ H04B 3/46; H04W 24/06; H04W 24/08; H04W 24/00
USPC .................................................. 370/310–350
See application file for complete search history.

(56) References Cited

U.S. PATENT DOCUMENTS

| 6,804,512 B1 * | 10/2004 | Baker et al. ................... 455/423 |
| 2008/0096596 A1 * | 4/2008 | Murphy ........................ 455/500 |
| 2008/0207143 A1 * | 8/2008 | Skarby et al. ................. 455/103 |
| 2012/0269067 A1 * | 10/2012 | Burchfiel ..................... 370/236 |

FOREIGN PATENT DOCUMENTS

| DE | 100 25 838 A1 | 12/2001 |
| DE | 100 25 838 B4 | 7/2005 |
| EP | 0 905 940 A2 | 3/1999 |
| WO | WO 00/59250 A1 | 10/2000 |
| WO | WO 02/082670 A2 | 10/2002 |

OTHER PUBLICATIONS

International Preliminary Report on Patentability, PCT/EP2009/001891, Nov. 18, 2010, pp. 1-7.
International Search Report, PCT/EP2009/001891, dated Sep. 23, 2009, pp. 28-33.

* cited by examiner

*Primary Examiner* — Andrew Chriss
*Assistant Examiner* — Kenan Cehic
(74) *Attorney, Agent, or Firm* — Ditthavong & Steiner, P.C.

(57) ABSTRACT

A method for determining a channel quality for the transmission of data in the channel by a test device. The test device transmits the data with the determined channel quality to a device to be tested which determines one or more pieces of decision information. The device to be tested forwards the piece(s) of decision information to the test device as a response signal and the test device reads the piece(s) of decision information from the response signal. The piece(s) of decision information from the response signal is/are uniquely attributed to a transmission mode to be adjusted. The initially determined channel quality is also uniquely attributed to an expected transmission mode. The expected transmission mode is compared with the transmission mode to be adjusted in a comparative unit in the evaluation unit, thereby allowing a statement regarding the correctness of the transmission mode to be adjusted.

14 Claims, 5 Drawing Sheets

METHOD FOR TESTING THE TRANSMISSION MODES OF A RADIO DEVICE

CROSS-REFERENCE TO RELATED APPLICATION

The present application is a national phase application of PCT Application No. PCT/EP2009/001891, filed on Mar. 19, 2009, and claims priority to German Application No. 10 2008 018 807.7, filed on Apr. 15, 2008, and German Application No. 10 2008 063 612.6, filed on Dec. 18, 2008, the entire contents of which are herein incorporated by reference.

BACKGROUND OF THE INVENTION

1. Field of the Invention

The invention relates to a method for testing the transmission states of a device for wireless communication.

2. Discussion of the Background

Digital mobile radio devices and also other devices for wireless communication are becoming ever more complex and increasingly have at their disposal transmission parameters which can be adapted to the channel quality and which enable a plurality of transmission states merely by reason of practical combinations thereof. The channel quality describes the quality of the physical transmission channel. The transmission state which is to be adjusted is selected by means of an item or items of decision information, e.g. of a measured transmission quality, which is/are transmitted by the mobile radio device. In the development of these devices which are becoming ever more complex there is a need to monitor whether the transmission state to be adjusted, determined from the transmitted information, has been correctly selected or whether the item(s) of decision information—on the basis of which the transmission state to be adjusted is selected—is correct.

Currently, the adaptation of the transmission states to decision information such as for example the channel quality is only measured indirectly or statistically using the transmitted data rate. For example, data are transmitted to a radio device to be tested and the channel quality is varied over time. In the simplest case, the channel quality is continuously improved e.g., linearly as time progresses starting from a very poor channel quality and the data rate of the transmitted data is measured. The data rate depends upon for example the selected modulation type and thus permits an indirect inference of the actually used transmission state. If the adaptation of the transmission states functions effectively, higher data rates for each channel quality are obtained than for poor adaptations. The function of the channel quality over time can be varied ever further in order to simulate fluctuations in the channel quality as occur in reality. Therefore, e.g. fading oscillations are simulated in the German patent specification DE 100 25 838 B4 by a Monte Carlo method.

A first problem associated with the indirect measurement of the transmission state adaptation is that the data rate does not show a great deal of interesting information such as for example the occurrence rate of the transmission state changes, or which transmission states are assumed or how these develop over time.

A second problem is that owing to the described measuring methods of the Prior Art, problem regions, such as for example switching points at which a change is made from one transmission state to another, cannot be tested individually and specifically.

SUMMARY OF THE INVENTION

Embodiments of the present invention advantageously solve the above described problems of the Prior Art and to provide an improved testing method.

The method in accordance with the invention firstly establishes a channel quality of a transmission channel for transmitting data in this transmission channel through a test device to a device to be tested. The data are sent by the test device using the established channel quality to a the device to be tested which determines at least one item of decision information at least from the transmitted data. The device to be tested sends this at least one item of decision information in a response signal to the test device which reads out this decision information from the response signal. The item(s) of decision information from the response signal is/are unequivocally allocated, by the test device, to a transmission state to be adjusted. The channel quality established at the outset is also unequivocally allocated to an expected transmission state by the test device. Comparing the expected transmission state with the transmission state to be adjusted enables a conclusion to be drawn regarding the correctness of the transmission state to be adjusted.

The subordinate Claims relate to advantageous developments of the invention.

Therefore, it is particularly advantageous for example to adjust the transmission state to be adjusted—which was determined from the item(s) of decision information—during the subsequent transmission of data.

A further advantageous development of the invention is the use of the transmission quality as decision information.

In the method in accordance with the invention it is advantageous that by adjusting a channel quality which can always be unequivocally allocated to a transmission state, transmission states which are specifically determined can be adjusted. For example the channel quality can be adjusted such that it is precisely in the problem region of a switching point between two directly adjacent transmission states and the decision information subsequently sent back can be examined. The switching point is that channel quality at which in the case of ideal evaluation items of decision information are transmitted back by for example a mobile radio device, which items of information are located at the limit of a change of the transmission state to be allocated. By varying the channel quality over time, an extremely large number of test scenarios can be performed for the specific examination of the transmission states or the change can be made between the transmission states. For example by way of infinitesimally small random jumps of the channel quality about a switching point, the switching behaviour caused by the item(s) of decision information can be specifically examined. On the other hand, by way of a specific jump, in the case of which several transmission states or the channel quality intervals allocated to these transmission states are skipped, to a channel quality, the adaptation speed of the transmission states in the case of large channel quality changes can be examined.

It is also advantageous that by way of the unequivocal allocation of the item(s) of decision information to the transmission states, not only the data rate but also directly the transmission states and the change thereof can be examined. As a result, the chronology and the occurrence rate of the switching processes inter alia can be analysed and in particular the correctness of the decision information determined by the mobile radio device can be checked.

The method in accordance with the invention is suitable for testing all those devices for wireless communication which support several distinguishable transmission states and specify these states by way of particular decision information. This applies above all to mobile radio devices which are all devices which use the mobile radio transmission standards, such as GSM (Global System for Mobile Communication), UMTS (Universal Mobile Telecommunication System), LTE (Long Term Evolution), WiMAX (Worldwide Interoperability for Microwave Access) etc. for transmission. However, the testing method in accordance with the invention can also test digital devices having wireless communication, in particular radio, from other fields such as for example Wireless LAN (Local Area Network).

BRIEF DESCRIPTION OF THE DRAWINGS

A possible exemplified embodiment will be described in detail hereinafter with the aid of the drawing, in which.

DETAILED DESCRIPTION OF EXEMPLARY EMBODIMENTS OF THE INVENTION

Figure 1:
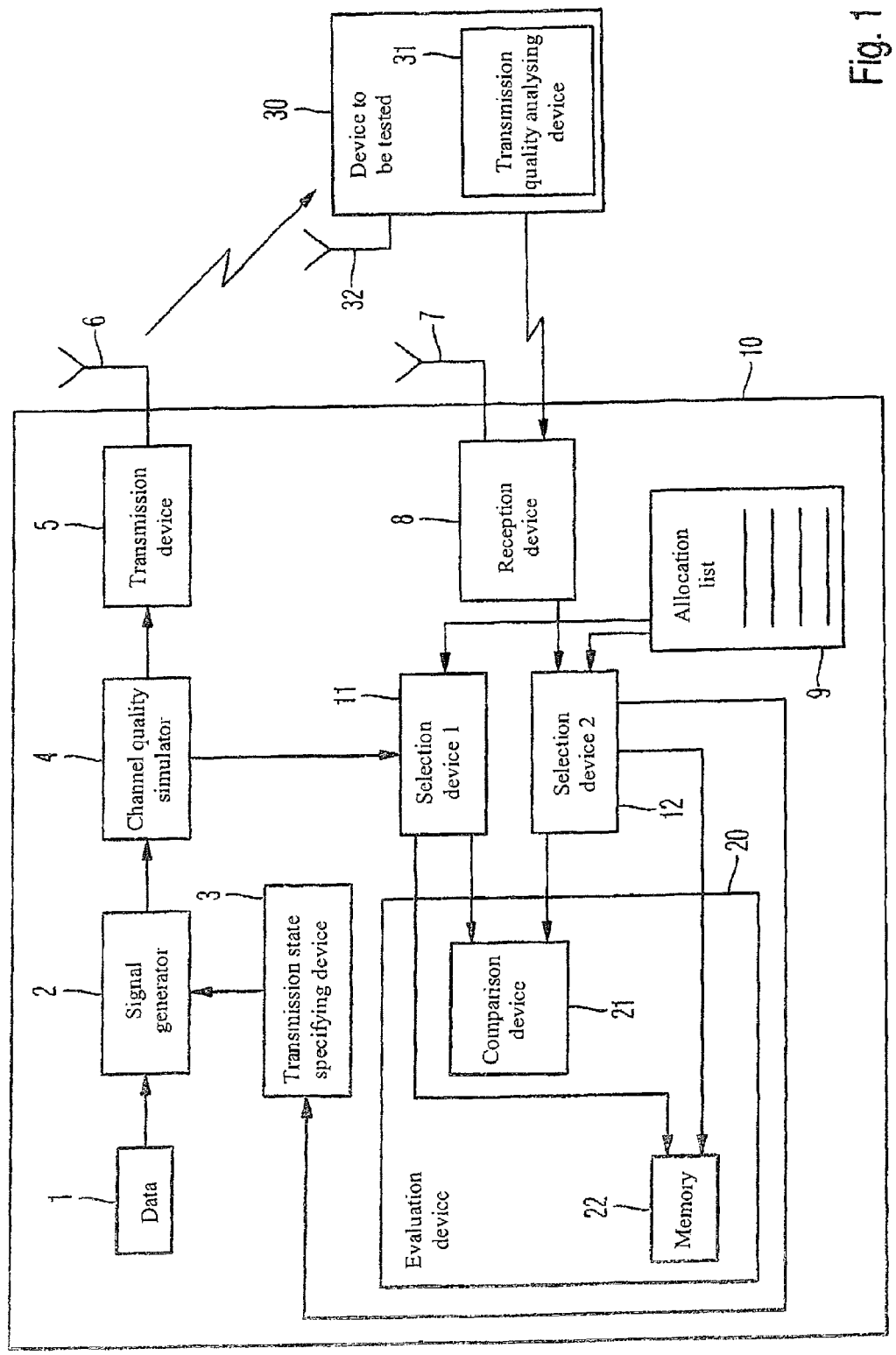
FIG. 1 shows an exemplified embodiment of a test device for implementing the method in accordance with the invention.

FIG. 1 shows a possible exemplified embodiment of a test device 10 for implementing the method in accordance with the invention. An exemplified test device 10 for testing a mobile radio device 30 will be explained hereinafter as a device for wireless communication.

The test device 10 includes a signal generator 2, a channel quality simulator 4, a transmission device 5 including an antenna 6, a reception device 8 accordingly connected with a further antenna 7, two selection devices 11 and 12 which are connected to an allocation list 9, and an evaluation device 20.

Firstly, data 1 are produced in the test device. These data 1 can be produced for example by a random sequence generator or can consist of previously established sets of test data. Alternatively, it is also possible to import the data into the test device 10 through an interface, not shown. The data 1 are supplied to a signal generator 2 which modulates the data 1 to a digitally modulated high frequency signal corresponding to a transmission state to be adjusted. The possible transmission states are established by the standard forming the basis of the test. The signal generator 2 receives the transmission state to be adjusted from the transmission state specifying device 3.

A particular transmission state, also referred to in mobile radio communication as Code Book entry, is a transmission parameter or a set of transmission parameters which unequivocally establishes the production of the high frequency signal transmitting the data. The different mobile radio standards each support the adjustment of a plurality of transmission parameters such as for example the transmission power, the digital modulation scheme (Quadrature Phase Shift Keying (QPSK), Quadrature Amplitude Modulation (QAM), etc.), the number of signals to be transmitted in MIMO (Multiple Input Multiple Output) systems, the carrier frequencies used during transmission (subcarriers) in OFDM (Orthogonal Frequency Division Multiplexing) systems, etc. In modern mobile radio standards, an extremely large number of possible transmission states are produced by way of all the useful combinations of all the transmission parameters relevant for transmission.

By varying individual or several transmission parameters, the transmission can be adapted to the transmission conditions, e.g., to the channel quality and the item(s) of decision information resulting therefrom. Such a change between two different Code Book entries is hereinafter referred to as switching or a switching process. For example, in the case of a heavily distorted transmission, a switching process to a transmission having a higher power and/or to a more secure modulation scheme albeit having a lower transmission rate can be effected. In order to specifically test these switching processes, a particular channel quality is simulated during transmission.

The signal generator 2 sends the high frequency signal, produced on the basis of the transmission state received from the transmission state specifying device 3, to the channel quality simulator 4. The channel quality simulator 4 simulates a particular, previously established channel quality by the simulation of the interference occurring in the case of a real transmission such as for example multipath interference, fading, distortion, etc. This can be achieved in the simplest case by adding white noise to the produced high frequency signal or in the case of somewhat more complex channel quality simulation devices 4 by way of special fading and distortion simulators to which the high frequency signal is supplied from the signal generator 2 and which output a high frequency signal which is distorted pursuant to defined provisions. The strength of the distortion, which is inversely proportional to the channel quality, can be adjusted. The channel quality can be adjusted for example by test scenarios permanently stored in the channel quality simulator 4, e.g., as channel quality functions over time. Alternatively, the channel quality to be adjusted or the sequence of channel qualities to be adjusted can also be input externally via an interface, not shown.

The adjusted channel quality is sent to a first selection device 11. The selection device 11 allocates to the adjusted channel quality, via an allocation list 9 provided for example in a memory, a Code Book entry to be expected and forwards this to the comparison device 21 of the evaluation device 20. The allocation list 9 contains for example a table which unequivocally allocates a Code Book entry, i.e., a particular transmission state, to each established channel quality and also each transmission quality measured by the device to be tested or the decision information transmitted back in a response.

Conversely, the unequivocal allocation of a Code Book entry to a corresponding channel quality interval can be removed from the allocation list 9. By establishing a channel quality corresponding to a Code Book entry, it is possible to use this information to provide the device to be tested with a particular channel quality or to achieve a change to a particular Code Book entry and to evaluate this switching process.

The high frequency signal distorted corresponding to the channel quality adjustment is sent to a transmission device 5 and emitted via an antenna 6. The mobile radio device 30 to be tested receives the transmitted high frequency signal via the antenna 32 and evaluates the transmitted data. The mobile radio device 30 calculates the transmission quality in a transmission quality analysing device 31 and produces therefrom at least one item of decision information. To this end, checksums are mostly added to the data to be transmitted prior to transmission, which checksums enable the mobile radio devices 30 to detect errors in bit blocks and/or also in individual bits. Alternatively, or in addition, the deviations from known pilot signals of the transmission can be analysed.

These items of information regarding the transmission quality are sent back to the reception device 8 of the test device 10 as decision information in a response signal. They contain at least one variable characterising the transmission quality, such as for example the Block Error Rate (BLER), the Bit Error Ratio (BER), the Channel Quality Index (CQI), Carrier to Interference plus Noise Ratio (CINR) or the Received Signal Strength Indication (RSSI), or the like. Alternatively, the high frequency signal and the response signal can also be transmitted via a cable connection.

The transmission quality thus obtained from the response signal is supplied to a second selection device 12 and is allocated, using the allocation list 9, to a Code Book entry to be adjusted for the further communication. This Code Book entry to be adjusted is sent as a transmission state to be adjusted to the transmission state specifying device 3 which instructs the signal generator 2 to select the transmission state or Code Book entry to be adjusted for the further transmission of data. The Code Book entry to be adjusted is additionally sent by the second selection device 12 to the comparison device 21 of the evaluation device 20.

The comparison device 21 of the evaluation device 20 now compares the Code Book entry which is to be expected with the Code Book entry to be adjusted. The evaluation device 20 can use the result of the comparison device 21 to draw a conclusion regarding the correctness of the Code Book entry to be adjusted owing to the decision information determined by the mobile radio device.

This process is implemented for example in a frequency f established by the occurrence rate of the response signal. This results in a measurement of a Code Book entry to be adjusted, of an expected Code Book entry and of a correctness value of the Code Book entry to be adjusted with the sampling rate f which permits an analysis of the measurement values over time. With regard to a subsequent analysis, the Code Book entry to be adjusted and the expected Code Book entry can be stored in a memory 22 of the evaluation device 20. The correctness value does not have to be stored as redundant information since it can be reproduced at any time by a new comparison of the expected Code Book entry with the Code Book entry to be adjusted. Additional evaluation information can be obtained using the information in the allocation list, such as for example in the case of a false Code Book entry to be adjusted, how far removed the false Code Book entry to be adjusted is from the correct Code Book entry.

In addition to the decision information purely relating to the connection, additional decision information can also be consulted as decision information such as for example a movement speed determined by a GPS (Global Position System) in the mobile radio device 30 and/or a recorded history of the Code Book entry to be adjusted. Therefore, for example in the case of a high speed of the mobile radio device and/or in the case of a recorded history of the Code Book entries containing many and/or large fluctuations in the channel quality and thus in the Code Book entries, a change to a far removed Code Book entry to be adjusted can be immediately allowed. On the other hand, in the opposite case, in which the mobile radio device 30 has not moved for a long period of time and/or its history does not contain any fluctuations in the channel quality or Code Book entries, the mobile radio device can delay a possibly far removed Code Book entry to be adjusted until this Code Book entry is confirmed or transpires to be erroneous.

A second Code Book entry which is "far removed" from a first Code Book entry is a Code Book entry whose correspondingly allocated channel quality interval is far removed from the corresponding channel quality interval of the first Code Book entry. In other words, between these two corresponding channel quality intervals there are at least two channel quality intervals which in turn are allocated other Code Book entries. Two "nearby" Code Book entries are two Code Book entries whose corresponding channel quality intervals are close to each other, i.e., there is only one channel quality interval of a corresponding Code Book entry or only a small number of channel quality intervals of further corresponding Code Book entries between them. Two "adjacent" Code Book entries are two Code Book entries whose channel quality intervals adjoin each other and which thus comprise a common switching point. For higher dimensional decision information spaces, i.e., with n variables as decision information with n>1, these terms are used corresponding to a degree of removal, defined in this space, between these n-dimensional volumes in the decision information space.

Alternatively, it is feasible in the method in accordance with the invention that the mobile radio device 30 directly selects the Code Book entry to be adjusted on the basis of the item(s) of decision information and sends this in a response signal to the test device 10 if this provides for a future transmission standard e.g., in mobile radio communication.

Figure 2:
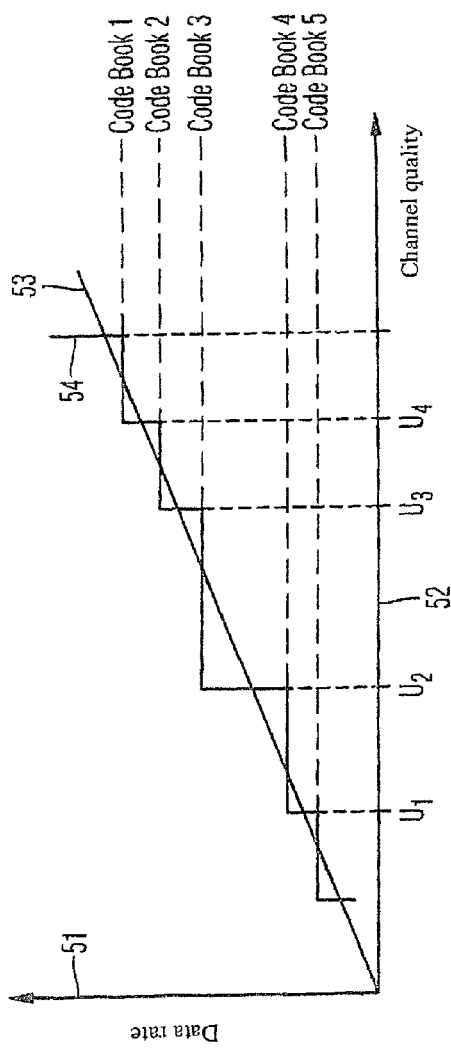
FIG. 2 shows a measuring curve of the data rate with respect to the channel quality for explaining the method in accordance with the invention.

By way of example, a measured data rate is plotted in FIG. 2 with respect to the channel quality as measured in the Prior Art.

The x-axis shows the channel quality 52 and the y-axis shows the data rate 51. The plotted measurement curve 54 shows the data rate with respect to the channel quality and comprises discrete jumps in the data rate since a Code Book entry permitting a higher data rate can only be used from a certain better channel quality. In the case of a further increase in the channel quality 52, the data rate 54 within the next channel quality interval remains constant until the channel quality 52 permits a next Code Book entry from the next switching point $U_i$. In any case, this allocation cannot be seen from the Prior Art. The straight line 53 shows a comparison line 53 adapted to the step function 54 whose intercept and slope parameters can be used to specify the data rate of a mobile radio device 30.

FIG. 2 shows, beyond the Prior Art, an exemplified allocation of the channel quality or the channel quality intervals between adjacent switching points $U_i$, $U_{i+1}$ to the Code Book entries 1 to 5.

Figure 3:
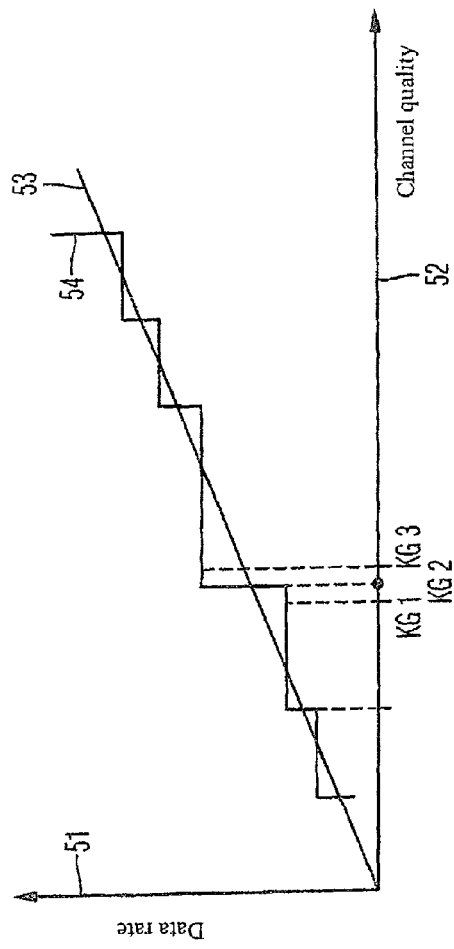
FIG. 3 shows a possible test scenario in accordance with the invention for individually examining a switching point.

FIGS. 3 to 5 shows different exemplified measurement scenarios in accordance with the invention using the example of allocating the Code Book entries to the channel quality intervals shown in FIG. 2.

FIG. 3 shows the allocation example from FIG. 2 and a measurement scenario for examining a switching point $U_i$ which is located at the channel quality KG 2. A switching point $U_i$ is a point in the channel quality as a point in the decision information space at which ideally a switching process from one Code Book to another occurs, i.e., at which a transmission state transition occurs.

If the channel quality 52 is now set at precisely such a switching point $U_i$ at KG 2, the determined Code Book entries to be adjusted can then be evaluated, which Code Book entries were sent from the mobile radio device 30 to the test device 10 by way of the response signals after adjusting this channel quality. The occurrence rate of the switching process is, for example, an interesting aspect. A "good" mobile radio device 30 could thus recognise the problem region as being such and inhibit constant reciprocal changing between the Code Book entries 3 and 4 whereas a "poor" mobile radio device 30 would cause a large number of switching processes.

In order to examine such switching processes between adjacent Code Book entries, there are many variations of the above described method. For example, the channel quality 52 can also be set at a point in closest proximity to the switching point KG 2, i.e., between KG 1 and KG 3 in order to monitor whether the correct Code Book entry is adjusted. If a channel quality 52 is adjusted between KG 1 and KG 2, then the Code Book entry 4 would be the correct Code Book entry to be adjusted. On the other hand, if a channel quality 52 is adjusted between KG 2 and KG 3, then the Code Book entry 3 would be the correct Code Book entry to be adjusted. The distance designation "in closest proximity" is a distance which is in the order of magnitude of the error of the corresponding transmission quality determination of the mobile radio device 30. This region defines the problem area of a switching process and can be preferably adjusted in the implementation of the method.

A further test scenario would be to randomly vary the switching point in closest proximity to the switching point in order to analyse the occurrence rate of the switching process.

Figures 4A, 4B:
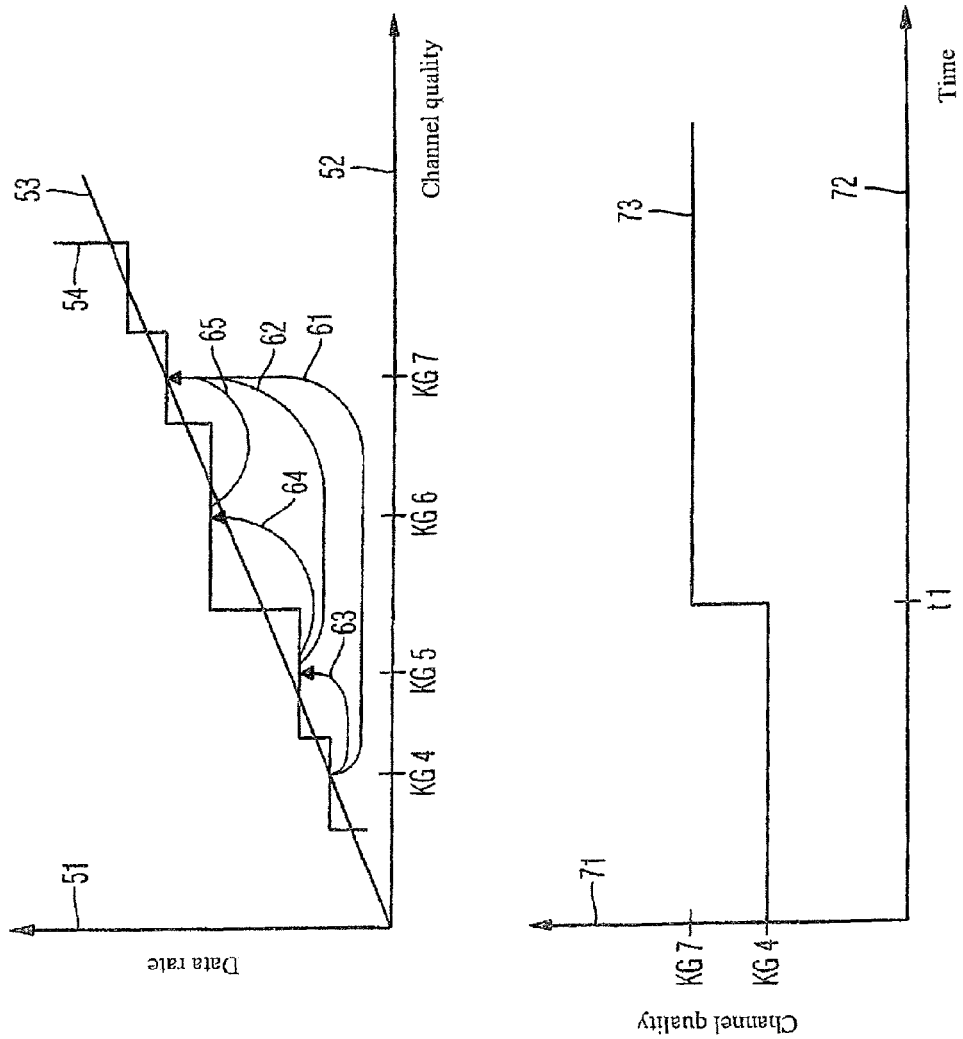
FIG. 4A shows a possible test scenario in accordance with the invention for analysing large jumps in the channel quality which include transitions over several transmission states.
FIG. 4B shows the channel quality function established for the test scenario shown in FIG. 4A with respect to time.

FIG. 4A shows the allocation example from FIG. 2 and a measurement scenario for examining a switching process to a non-adjacent Code Book entry.

To this end, the channel quality KG4 corresponding to the Code Book entry 5 is firstly established for a particular period of time and then after the point in time t1 of the channel quality change the channel quality 7 corresponding to the Code Book entry 2 is established for a particular period of time, as shown in FIG. 4B. FIG. 4B shows the channel quality function 73 in a diagram illustrating the channel quality 71 with respect to time 72 as a possible measurement scenario for the examination described in FIG. 4A.

By evaluating the decision information sent back by the mobile radio device 30 and the Code Book entries which are to be adjusted and which result therefrom, it can be ascertained whether the Code Book entry jumps directly from the Code Book entry 5, which corresponds to the firstly established channel quality KG 4, to the Code Book entry 2 which corresponds to the channel quality KG 7 established after t1. This correct, direct switching process from Code Book entry 5 to Code Book entry 2 is illustrated in FIG. 4A by the arrow 61. As a result, it could also be ascertained whether a mobile radio device 30 is switched by the described switching process not directly but rather via the Code Book 3 to be adjusted, as illustrated by the arrows 63 and 62, or via all the intermediate Code Book entries 3 and 4.

In this regard, the temporal progression of the switching process can also be analysed. Thus, for example, a type of inertia time after t1 can be measured in which the response signal still causes the Code Book 5 as the transmission state to be adjusted.

Figure 5A:
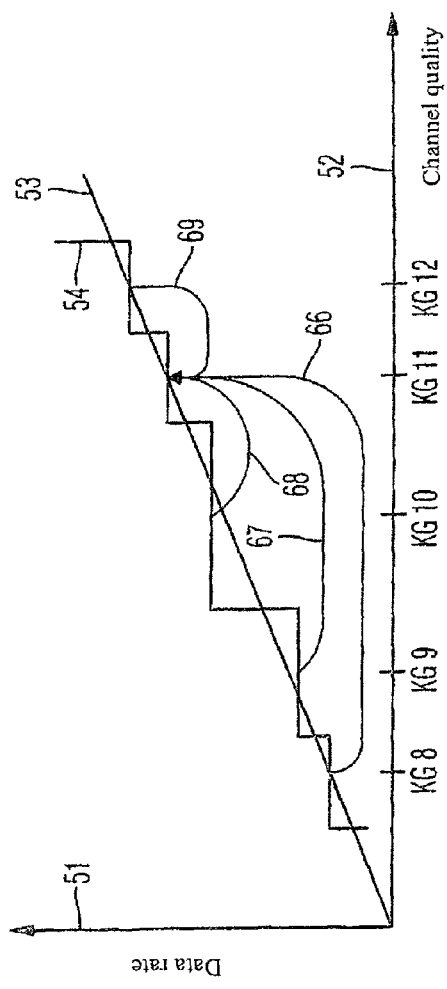
FIG. 5A shows a possible test scenario in accordance with the invention for analysing possible hysteresis effects in the case of jumps from different transmission states to the same transmission state in each case.

FIG. 5A shows the allocation example from FIG. 2 and a measurement scenario for examining an hysteresis effect in a switching process.

Figure 5B:
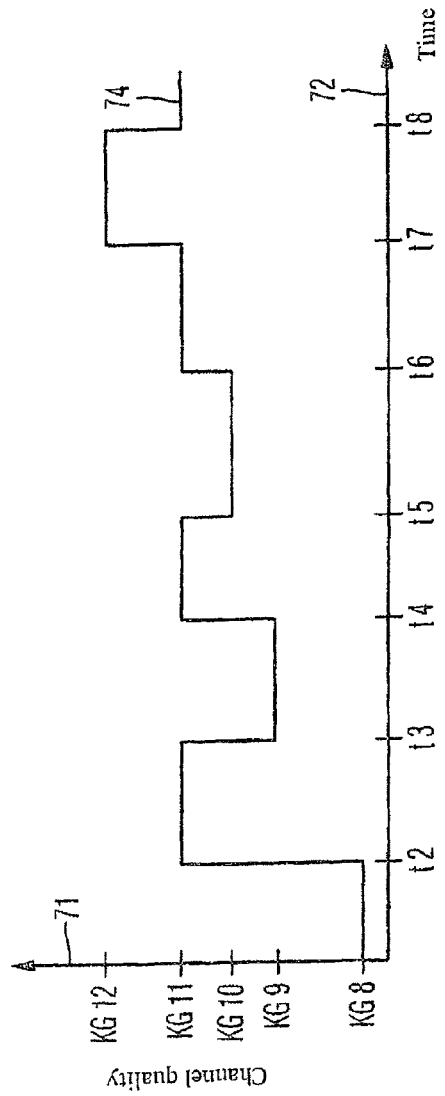
FIG. 5B shows the channel quality function established for the test scenario shown in FIG. 5A with respect to time.

To this end, channel qualities KG 8, KG 9, KG 10 and KG 12 which are each different for a particular time and each correspond to a Code Book entry 5, 4, 3 and 1, are established in the channel quality simulation device 4. After each channel quality KG 8, KG 9, KG 10, KG 12 established for a particular period of time, a channel quality KG 11 is established in each case for a particular period of time, as shown in FIG. 5B. FIG. 5B shows the channel quality function 74 in a diagram illustrating the channel quality 71 with respect to time 72 as a possible measurement scenario for the examination described in FIG. 5A.

By means of the channel quality curve shown in FIG. 5B, it can be achieved using the evaluated response signal that, provided that the mobile radio device 30 sends the correct decision information, a switching process occurs repeatedly from different Code Book entries KG 8, KG 9, KG 10, KG 12 to the same Code Book entry KG 11. The particular periods of time for establishing a channel quality should be selected, in the case of this measurement scenario, to be so long that the Code Book entry corresponding to the established channel quality is also reliably adjusted. Alternatively, or in addition, the initial Code Book entries 5, 4, 3, 1 can also be enforced by way of an instruction to the transmission state specifying device 3.

It can thus be examined what influence the initial Code Book entry, in this case Code Book entries 5, 4, 3 and 1 has on the switching process to the target Code Book entry, in this case Code Book entry 2. How do the switching processes 68 and 69 of adjacent Code Book entries 1 and 3 behave? How do switching processes 66 and 67 of nearby Code Book entries behave? How do switching processes, not shown, of far removed Code Book entries behave? The method in accordance with the invention enables these questions to be answered.

The history can also be considered as additional decision information of the transmission states using the method in accordance with the invention. If, for example, the channel quality is consistently better in the preceding period of time, it can be examined for example whether the mobile radio device 30 has considered this. For example, in that it rather permits a transition to a transmission state allocated to a better channel quality than a transition to a transmission state allocated to a poorer channel quality. The analysis and measurement scenarios listed here are only some of the limitless possibilities permitted by the method in accordance with the invention.

The arrows in FIG. 4A and in FIG. 5A represent switching processes between Code Book entries as they are actually adjusted owing to the response signal of the mobile radio device and have only an indirect correlation with the channel quality 52 shown on the x-axis. The Code Book entries are indeed allocated to particular channel quality intervals but in the switching processes illustrated by the arrows, the allocated channel quality intervals are not established by the channel quality simulation device 4. The channel quality 52 is only established on the basis of the measurement scenario as shown in FIG. 4B or in FIG. 5B.

Figure 6:
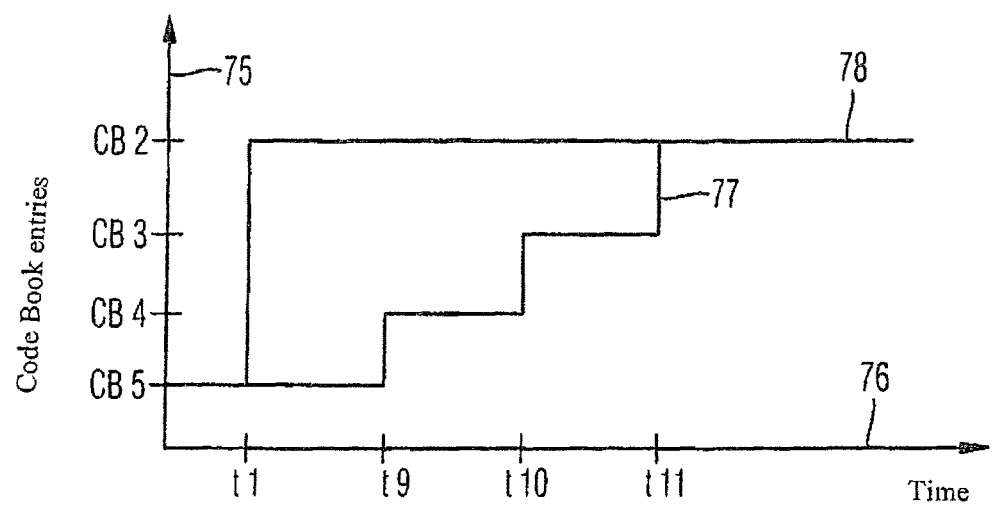
FIG. 6 shows a possible visualisation of the evaluation in accordance with the invention of the test scenario shown in FIG. 4A by representing the transmission states with respect to time.

Finally, FIG. 6 shows a possible visualisation of the analysis of the Code Book entries over time. The actually adjusted Code Book entries 77 of the measurement scenario illustrated in FIGS. 4A and 4B are contrasted with the expected Code Book entries 78 in dependence upon time. This is illustrated in a diagram in which the discrete Code Book entries 75 are plotted with respect to time 76.

The ideal Code Book entry 78 likewise switches, directly during the change of the channel quality from KG 4 to KG 7 at point in time t1, the Code Book entry from CB 5 to CB 2. The actually adjusted Code Book entry progression 77 first switches at time t9 to the next adjacent Code Book entry 4 by way of the switching process 63. After that, two further switching processes 64 and 65 are required in order to finally achieve the target Code Book entry 2 at point in time t11.

The invention is not limited to the illustrated exemplified embodiment. On the contrary, individual features can also be combined with each other in an advantageous manner.

The invention claimed is:

1. A method for testing a device for wireless communication, including the following steps:
    establishing a channel quality of a transmission channel for transmitting data in this channel through a test device, wherein the established channel quality is particular to a transmission state out of plural transmission states and is particularly chosen to such a value that tests switching processes between transmission states, wherein the channel quality is adjusted by the test device such that it is located at or in a distance above or below a switching point $U_i$ between two transmission states, and wherein the distance is in the order of magnitude of the error of a corresponding channel quality determination of the device to be tested;
    transmitting data from the test device to a device to be tested using the established channel quality;
    evaluating the data transmitted using the established channel quality in the device to be tested for determining at least one item of decision information;
    sending a response signal containing the at least one item of decision information back to the test device;
    allocating the at least one item of decision information obtained from the response signal to a transmission state to be adjusted, wherein precisely one transmission state is unequivocally allocated to each total content of obtained items of decision information;
    determining an expected transmission state corresponding to the established channel quality used for transmission; and
    comparing the expected transmission state to the transmission state to be adjusted, wherein the transmission state to be adjusted is used for further transmission of data.

2. The method as claimed in claim 1, wherein the at least one item of decision information received with the response signal comprises at least one item of information describing a transmission quality.

3. The method as claimed in claim 1, wherein the channel quality is changed by the test device such that a change to a transmission state not allocated to a directly adjacent channel quality interval is effected.

4. The method as claimed in claim 1, wherein the channel quality is successively changed by the test device such that starting from different channel quality intervals, the change to a selected channel quality interval is simulated.

5. The method as claimed in claim 1, wherein a chronology of expected transmission states and transmission states to be adjusted is stored and evaluated.

6. The method as claimed in claim 5, wherein an occurrence rate of switching between different transmission states to be adjusted is determined.

7. The method as claimed in claim 5, wherein the temporal progression of switching between transmission states expected and/or adjusted is measured.

8. The method as claimed in claim 5, wherein change of transmission states to be adjusted are evaluated in relation to their history of transmission state changes.

9. The method as claimed in claim 2, wherein the channel quality is changed by the test device such that a change to a transmission state not allocated to a directly adjacent channel quality interval is effected.

10. The method as claimed in claim 2, wherein the channel quality is successively changed by the test device such that starting from different channel quality intervals, the change to a selected channel quality interval is simulated.

11. The method as claimed in claim 2, wherein a chronology of expected transmission states and transmission states to be adjusted is stored and evaluated.

12. The method as claimed in claim 11, wherein the occurrence rate of the switching between different transmission states to be adjusted is determined.

13. The method as claimed in claim 11, wherein the temporal progression of switching between transmission states expected and/or adjusted is measured.

14. The method as claimed in claim 11, wherein change of transmission states to be adjusted are evaluated in relation to their history of transmission state change.

\* \* \* \* \*